United States Patent Office 3,267,471
Patented August 16, 1966

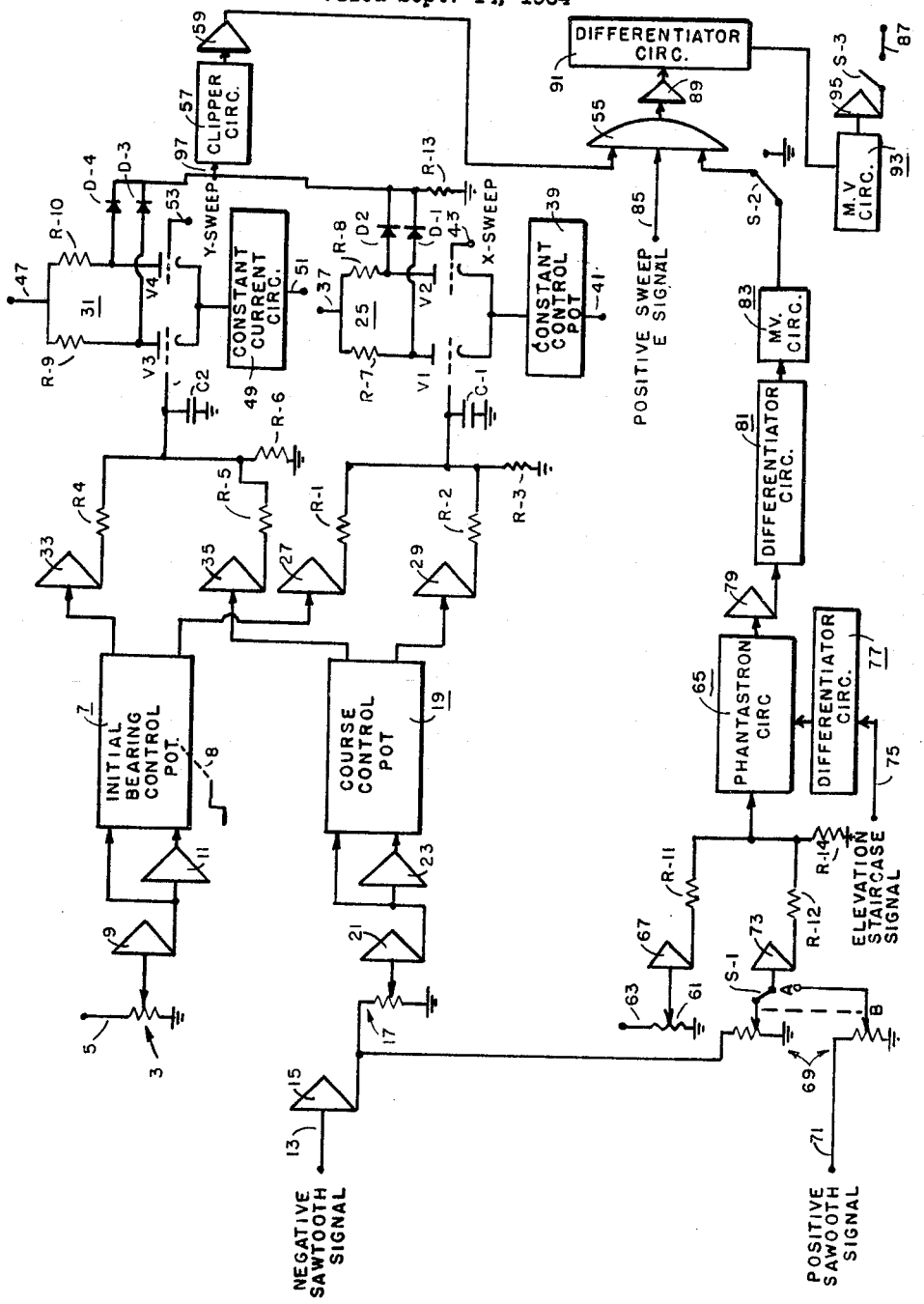

3,267,471
RADAR TARGET ECHO SIGNAL SIMULATOR
Milton H. Greenfield, Bronx, and Anthony Abajian, Glen Oaks, N.Y., assignors, by mesne assignments, to the United States of America as represented by the Secretary of the Navy
Filed Sept. 14, 1964, Ser. No. 396,437
6 Claims. (Cl. 343—17.7)

The present invention relates to test and training equipment for radar control systems and more particularly to novel and improved apparatus for generating a simulated target return signal for presentation on a type P cathode ray indicator of a radar control system.

In the use of various types of radar searching and tracking apparatus, it is often necessary and desirable for checking, testing and training purposes to develop artificial signals that simulate return or echo signals from a target. Although various types of simulators of this nature have been developed in the past, considerable difficulty has been experienced heretofore in devising a simulator in which the range and bearing of the simulated target and its speed and course, as well as its elevation position and its change of position in elevation may be readily and independently controlled.

It is therefore a principal object of the present invention to provide a novel and improved radar target simulator in which changes in range, bearing and elevation of a target may be simulated and controlled with facility in a realistic manner.

It is a further object of the present invention to provide a novel and improved radar target simulator in which changes in the range bearing and elevation of a simulated target may be simultaneously and independently varied and controlled.

It is a further object of the present invention to provide novel and improved apparatus for generating a simulated target return signal for the cathode ray indicator of a radar control system which is relatively simple in design and yet permits simulation of an actual target in flight in a practical and effective manner.

Other objects and many of the attendant advantages of this invention will be readily appreciated as the same becomes better understood by reference to the following detailed description when considered in connection with the accompanying drawing wherein the single figure of the drawing is a diagrammatic view of a preferred embodiment of the present invention.

Referring now to the drawing, it will be noted that the initial range control potentiometer 3 is connected between the negative 150 volt line 5 and ground. The variable arm of potentiometer 3 is coupled to one end of the sine-cosine initial bearing control potentiometer 7 through emitter follower 9. The output of emitter follower 9 is also coupled to the opposite end of potentiometer 7 through the feedback amplifier 11.

A linear negative sawtooth potential on conductor 13, which may be obtained in any suitable conventional manner such as by rotating the variable arm of a potentiometer at constant speed, after being fed through cathode follower 15, is applied across the target speed control potentiometer 17. The variable arm of potentiometer 17 is coupled to one end of the sine-cosine course control potentiometer 19 through emitter follower 21. The output of emitter follower 21 is also coupled to the opposite end of potentiometer 19 through feedback amplifier 23.

The sine output signals of potentiometers 7 and 19 are respectively coupled to the control grid of triode V–1 of differential amplifier 25 through cathode followers 27 and 29 and resistors R–1, R–2 and R–3 of a resistor summing network. Similarly, the cosine output signals of potentiometers 7 and 19 are respectively coupled to the control grid of triode V–3 of differential amplifier 31 through cathode followers 33 and 35 and resistors R–4, R–5 and R–6 of a resistor summing network.

The plate circuit of triode V–1 of differential amplifier 25 extends from the positive 300 volt supply line 37 through resistor R–7, the tube, and the conventional constant current circuit 39 to the negative 300 volt supply line 41. The control grid of triode V–1 is preferably coupled to ground as shown through condenser C–1. The plate circuit of triode V–2 of differential amplifier 25 extends from the positive 300 volt supply line 37 through resistor R–8, the tube and the constant current circuit 39 to the negative 300 volt supply line 41. The control grid of triode V–2 is connected to the X sweep circuit of the cathode ray indicator of the radar gear to which the simulated radar target signal is to be applied through conductor 43.

The plate circuit of triode V–3 of differential amplifier 31 extends from the positive 300 volt supply line 47 through resistor R–9, the tube, and the conventional constant current circuit 49 to the negative 300 volt supply line 51. The control grid of triode V–3 is preferably coupled to ground as shown through condenser C–2. The plate circuit of triode V–4 of differential amplifier 31 extends from the positive 300 volt supply line 47 through resistor R–10, the tube and the constant current circuit 49 to the negative 300 volt supply line 51. The control grid of triode V–4 is connected to the Y sweep circuit of the cathode ray indicator of the radar gear to which the simulated radar target signal is to be applied through conductor 53. The plates of triodes V–1, V–2, V–3 and V–4 are coupled to "AND" circuit 55 respectively through a coincidence circuit consisting of diodes D–1, D–2, D–3 and D–4 and through the clipper circuit 57 and amplifier 59.

The initial elevation control potentiometer 61 is connected between the positive 150 volt line 63 and ground. The variable arm of potentiometer 61 is coupled to the conventional variable delay phantastron circuit 65 through cathode follower 67 and resistor R–11 of a resistor summing network. Section A of the two section ganged potentiometer 69 is connected between the output circuit of cathode follower 15 and ground. A linear positive sawtooth potential on conductor 71, which may be obtained in any suitable conventional manner such as by rotating the variable arm of a potentiometer at constant speed, is applied across section B of potentiometer 69 as shown. The variable arms of sections A and B of potentiometer 69 are coupled to the phantastron circuit 65 through opposite poles of the elevation sense control switch S–1, cathode follower 73, and resistor R–12 of the resistor summing network. The elevation staircase signal from the radar gear to which the simulated target signal is to be applied is also coupled to the phantastron 65 from conductor 75 through the differentiating circuit 77.

The output circuit of phantastron 65 is coupled to "AND" circuit 55 through cathode follower 79, the differentiator circuit 81, the multivibrator circuit 83, and the short-long range control switch S–2. The positive sweep gate signal from the radar gear to which the simulated target signal is to be applied is also coupled to "AND" circuit 55 through conductor 85. The output circuit of "AND" circuit 55 is coupled to the video output conductor 87 through the inverter amplifier 89, the differentiator circuit 91, the multivibrator 93, the cathode follower 95 and the video control switch S–3.

In operation, the initial range of the simulated target is set on the range control potentiometer 3. This potential is applied to one end of the initial bearing control potentiometer 7 through the emitter follower 9. The output of emitter follower 9 also drives the feedback amplifier 11 which provides a D.C. potential equal and opposite in polarity at the other end of the initial bearing control potentiometer 7. The conventional sine-cosine potentiometer 7 provides two output voltages, $E_1 \sin \theta_1$ and $E_1 \cos \theta_1$ which respectively represent the initial X and Y coordinate positions of the simulated target in space. Thus, it will be noted that variation of potentiometer 3 controls the initial range of the target and adjustment of the shaft rotation angle $\theta_1$ of potentiometer 7 establishes the initial bearing of the target.

Velocity of the target in space and resulting changes in its range and bearing are controlled by adjustment of potentiometer 17. Specifically, the negative sawtooth potential on conductor 13 is attenuated by the target speed potentiometer 17 so as to determine the rate of change of the target position. The output potential of potentiometer 17 is applied to one end of the course control potentiometer 19 through emitter follower 21. The output of emitter follower 21 also drives the feedback amplifier 23 which provides a varying D.C. potential equal and opposite in polarity at the other end of the course control potentiometer 19. The conventional sine-cosine potentiometer 19 provides two output voltages, $E_2 \sin \theta_2$ and $E_2 \cos \theta_2$ which respectively represent changes in the intial X and Y coordinate positions of the simulated target in space. Thus, it will be noted that variations of potentiometer 17 control the rate of change of the simulated target in space and adjustment of the shaft rotation angle $\theta_2$ of potentiometer 19 establishes the direction of change of the target.

The cosine wave potentials from potentiometers 7 and 19 are then respectively fed through cathode followers 27 and 29, combined in the resistor summing network of resistors, R–1, R–2 and R–3 to provide a D.C. signal that represents the instantaneous X position coordinate of the target. This D.C. signal is then applied to the input circuit of differential amplifier 25. Similarly, the sine wave potentials from potentiometers 7 and 19 are respectively fed through cathode followers 33 and 35 combined in the resistor summing network of resistors R–4, R–5 and R–6 to provide a D.C. signal that represents the instantaneous Y position coordinate of the target. This D.C. signal is then applied to the input circuit of differential amplifier 31.

The X and Y sweeps of the cathode ray indicator of the radar gear to which the simulated radar target signal is to be applied also respectively energize differential amplifiers 25 and 31. As each sawtooth pulse of the X sweep on the control grid of triode V–2 becomes equal to or exceeds the D.C. potential applied to the control grid of triode V–1, triode V–2, which is normally cut off, is energized, and triode V–1, which is normally energized, cuts off. This tends to produce a triangular negative pulse at the output of the coincidence circuit of diodes D–1 and D–2. Similarly, as each sawtooth pulse of the Y sweep on the control grid of triode V–4 becomes equal to or exceeds the D.C. potential applied to the control grid of triode V–3, triode V–4, which is normally cut off, is energized, and triode V–3, which is normally energized, cuts off. This tends to produce a triangular negative pulse at the output of the coincidence circuit of diodes D–3 and D–4.

When the pulse from the differential amplifier 25 through the coincidence circuit of diodes D–1 and D–2 does not coincide with the pulse from differential amplifier 31 through the coincidence circuit of diodes D–3 and D–4, no change in potential across output resistor R–13 occurs. When, however, the pulses from differential amplifiers 25 and 31 occur simultaneously, a negative output pulse is produced on conductor 97. Inasmuch as some portion of the output pulses of differential amplifiers 25 and 31 generally coincide during several succeeding pulses of the X and Y radar sweeps, the coincidence circuit of diodes D–1, D–2, D–3 and D–4 provides a series of negative triangular output pulses which increases in amplitude until full coincidence occurs, then decrease in amplitude until they no longer coincide. Thus, the output circuit of the coincidence circuit provides a so called space gate which consists of a series of negative triangular pulses, one for each azimuth angle where X and Y coincidence occurs, the amplitude of each triangular pulse being dependent upon the degree of coincidence of the X and Y pulses from amplifiers 25 and 31.

The space gate signal from the coincidence circuit on conductor 97 is then fed through the clipping circuit 57, which limits the number of pulses in the space gate to those which exceed a predetermined amplitude, and through amplifier 59 to the "AND" circuit 55.

The initial elevation angle of the simulated target is established on the elevation control potentiometer 61. This potential is applied to the resistor summing network of resistors R–11, R–12 and R–14 through cathode follower 67. The elevation rate control potentiometer 69, which is a two section ganged potentiometer, controls the rate of change of the initial elevation angle of the simulated target. The continually changing negative potential at the output of cathode follower 15 is applied across section A of potentiometer 69 and a continually changing positive potential on conductor 71 is applied across section B of potentiometer 69. The elevation sense switch S–1 selects either the positive or negative going elevation rate signal from potentiometer 69 to provide an ascending or descending simulated target path. The rate signal selected by switch S–1 is applied through cathode follower 73 to the resistor summing network of resistors R–11, R–12 and R–14 where it is summed with the initial elevation angle signal to provide an output signal that represents the instantaneous elevation angle of the simulated target. Thus, it will be noted that variations of potential set on potentiometer 61 control the initial elevation angle of the simulated target, changes in potential on sections A and B of potentiometer 69 determine the rate of change of the angle of elevation of the target and switch S–1 determines the sense or direction in which the change in elevation progresses.

The output signal of the resistor summing network is then used as the control voltage of the conventional variable delay phantastron 65. The elevation staircase input signal on conductor 75 is coupled to phantastron 65 through the differentiator circuit 77, to provide a pulse that triggers the phantastron 65 at the start of each elevation scan of the radar gear. The output pulse produced by the phantastron 65 is a signal delayed from the start of each radar elevation scan, the amount of the delay being determined by the control voltage from resistor summing network of resistors R–11, R–12 and R–14.

The phantastron output signal is then fed through the cathode follower 79, which improves the recovery time of the phantastron, and through the differentiator circuit 81 to the one-shot multivibrator cicuit 83. The multivibrator, when energized, remains energized while the simulated radar target is at the selected elevation angle and during short range operation provides a gate signal which is fed through switch S–2 to "AND" circuit 55 where it selects the X, Y space gate at the selected elevation angle. For long range operation, elevation data is not applicable and this input to "AND" circuit 55 is grounded through switch S–2. The positive sweep gate on conductor 85 is also coupled to "AND" circuit 55 and inhibits energization of "AND" circuit until the area of space of interest is swept.

The output signal of "AND" circuit 55 is then fed through the inverter amplifier 89 and differentiating circuit 91 to the multivibrator 93 which provides the simulated target video pulse. The time constant of multivibrator 93 is controlled in any suitable conventional manner to determine the width and shape of the simulated radar video pulse. The output of multivibrator 93 is then applied through cathode follower 95 and control switch S–3 to the video output conductor 87 from which the simulated video signal is supplied to the cathode ray indicator of the radar gear to be operated.

Obviously many modifications and variations of the present invention are possible in the light of the above teachings. It is therefore to be understood that within the scope of the appended claims, the invention may be practiced otherwise than as specifically described.

What is claimed is:

1. Apparatus for generating a simulated target return signal for application to the cathode ray indicator of a radar control system, said apparatus comprising:
    (a) means for providing a first D.C. potential;
    (b) a first sine cosine potentiometer;
    (c) means for applying the D.C. potential across the sine cosine potentiometer such that the amplitude of the D.C. potential represents the initial range of the simulated target and the shaft rotation angle of the potentiometer represents the initial bearing of the simulated target;
    (d) means for providing a linearly varying D.C. potential;
    (e) a second sine cosine potentiometer;
    (f) means for applying the linearly varying D.C. potential across the second sine cosine potentiometer such that the amplitude of the linearly varying potential represents the change in range of the simulated target and the shaft rotation angle of the second potentiometer represents the change in bearing of the simulated target;
    (g) means for summing the sine wave output signals of the first and second sine cosine potentiometers;
    (h) a circuit for comparing the summed sine wave signals with the X sweep signal of the radar system and developing an output pulse when the amplitude of the X sweep potential exceeds the amplitude of the summed sine wave signal;
    (i) means for summing the cosine wave output signal of the first and second sine cosine potentiometers;
    (j) a circuit for comparing the summed cosine wave signals with the Y sweep signals of the radar system and developing an output pulse when the amplitude of the Y sweep potential exceeds the amplitude of the summed cosine wave signal;
    (k) a coincidence circuit which is coupled to the comparison circuits and which provides an output pulse when the output pulses from the comparison circuits occur simultaneously;
    (l) means for providing a second D.C. potential which represents the angle of elevation of the simulated target;
    (m) a phantastron circuit;
    (n) means for coupling the second D.C. potential to the plate of the phantastron circuit;
    (o) means for triggering the phantastron circuit at the start of each elevation scan of the radar system and initiating its linear rundown voltage from the second D.C. potential;
    (p) an "AND" circuit;
    (q) and means for coupling the output circuit of the phantastron and the output of the coincidence circuit to the "AND" circuit; the output signal from the "AND" circuit being used to simulate the target return signal.

2. Apparatus for generating a simulated target return signal for application to the cathode ray indicator of a radar control system, said apparatus comprising:
    (a) means for providing a first D.C. potential;
    (b) a first sine cosine potentiometer;
    (c) means for applying the D.C. potential across the sine cosine potentiometer such that the amplitude of the D.C. potential represents the initial range of the simulated target and the shaft rotation angle of the potentiometer represents the initial bearing of the simulated target;
    (d) means for providing a linearly varying D.C. potential;
    (e) a second sine cosine potentiometer;
    (f) means for applying the linearly varying D.C. potential across the second sine cosine potentiometer such that the amplitude of the linearly varying potential represents the change in range of the simulated target and the shaft rotation angle of the second potentiometer represents the change in bearing of the simulated target;
    (g) means for summing the sine wave output signals of the first and second sine cosine potentiometers;
    (h) a circuit for comparing the summed sine wave signals with the X sweep signal of the radar system and developing an output pulse when the amplitude of the X sweep potential exceeds the amplitude of the summed sine wave signal;
    (i) means for summing the cosine wave output signal of the first and second sine cosine potentiometers;
    (j) a circuit for comparing the summed cosine wave signals with the Y sweep signals of the radar system and developing an output pulse when the amplitude of the Y sweep potential exceeds the amplitude of the summed cosine wave signal;
    (k) a coincidence circuit which is coupled to the comparison circuits and which provides an output pulse when the output pulses from the comparison circuits occur simultaneously;
    (l) means for providing a second D.C. potential which represents the angle of elevation of the simulated target;
    (m) a phantastron circuit;
    (n) means for coupling the second D.C. potential to the plate of the phantastron circuit;
    (o) means for triggering the phantastron circuit at the start of each elevation scan of the radar system and initiating its linear rundown voltage from the second D.C. potential;
    (p) an "AND" circuit;
    (q) means for coupling the output circuit of the phantastron and the output of the coincidence circuit to the "AND" circuit;
    (r) and means for shaping the output signal of the "AND" circuit so that it resembles a video target return signal.

3. Apparatus for generating a simulated target return signal for application to the cathode ray indicator of a radar control system, said apparatus comprising:
    (a) means for providing a first D.C. potential;
    (b) a first sine cosine potentiometer;
    (c) means for applying the D.C. potential across the sine cosine potentiometer such that the amplitude of the D.C. potential represents the initial range of the simulated target and the shaft rotation angle of the potentiometer represents the initial bearing of the simulated target;
    (d) means for providing a linearly varying D.C. potential;
    (e) means for varying the amplitude of the linearly varying D.C. potential;
    (f) a second sine cosine potentiometer;
    (g) means for applying the linearly varying D.C. potential across the second sine cosine potentiometer such that the amplitude of the linearly varying potential represents the change in range of the simulated target and the shaft rotation angle of the second potentiometer represents the change in bearing of the simulated target;
    (h) means for summing the sine wave output signals of the first and second sine cosine potentiometers;
    (i) a circuit for comparing the summed sine wave signals with the X sweep signal of the radar system and developing an output pulse when the amplitude of the X sweep potential exceeds the amplitude of the summed sine wave signal;
    (j) means for summing the cosine wave output signal of the first and second sine cosine potentiometers;

(k) a circuit for comparing the summed cosine wave signals with the Y sweep signals of the radar system and developing an output pulse when the amplitude of the Y sweep potential exceeds the amplitude of the summed cosine wave signal;

(l) a coincidence circuit which is coupled to the comparison circuits and which provides an output pulse when the output pulses from the comparison circuits occur simultaneously;

(m) means for providing a second D.C. potential which represents the angle of elevation of the simulated target;

(n) a phantastron circuit;

(o) means for coupling the second D.C. potential to the plate of the phantastron circuit;

(p) means for triggering the phantastron circuit at the start of each elevation scan of the radar system and initiating its linear rundown voltage from the second D.C. potential;

(q) an "AND" circuit;

(r) and means for coupling the output circuit of the phantastron and the output of the coincidence circuit to the "AND" circuit; the output signal from the "AND" circuit being used to simulate the target return signal.

4. Apparatus for generating a simulated target return signal for application to the cathode ray indicator of a radar control system, said apparatus comprising:

(a) means for providing a first D.C. potential;

(b) a first sine cosine potentiometer;

(c) means for applying the D.C. potential across the sine cosine potentiometer such that the amplitude of the D.C. potential represents the initial range of the simulated target and the shaft rotation angle of the potentiometer represents the initial bearing of the simulated target;

(d) means for providing a linearly varying D.C. potential;

(e) a second sine cosine potentiometer;

(f) means for applying the linearly varying D.C. potential across the second sine cosine potentiometer such that the amplitude of the linearly varying potential represents the change in range of the simulated target and the shaft rotation angle of the second potentiometer represents the change in bearing of the simulated target;

(g) means for summing the sine wave output signals of the first and second sine cosine potentiometers;

(h) a circuit for comparing the summed sine wave signals with the X sweep signal of the radar system and developing an output pulse when the amplitude of the X sweep potential exceeds the amplitude of the summed sine wave signal;

(i) means for summing the cosine wave output signal of the first and second sine cosine potentiometers;

(j) a circuit for comparing the summed cosine wave signals with the Y sweep signals of the radar system and developing an output pulse when the amplitude of the Y sweep potential exceeds the amplitude of the summed cosine wave signal;

(k) a coincidence circuit which is coupled to the comparison circuits and which provides an output pulse when the output pulses from the comparison circuits occur simultaneously;

(l) means for providing a second D.C. potential which represents the angle of elevation of the simulated target;

(m) means for providing a second linearly varying D.C. potential which represents change in angle of elevation of the simulated target;

(n) means for summing the second D.C. potential and the second linearly varying D.C. potential;

(o) a phantastron circuit;

(p) means for coupling the summed elevation potential to the plate of the phantastron circuit;

(q) means for triggering the phantastron circuit at the start of each elevation scan of the radar system and initiating its linear rundown voltage from the summed elevation potential;

(r) an "AND" circuit;

(s) and means for coupling the output circuit of the phantastron and the output of the coincidence circuit to the "AND" circuit; the output signal from the "AND" circuit being used to simulate the target return signal.

5. Apparatus for generating a simulated target return signal for application to the cathode ray indicator of a radar control system, said apparatus comprising:

(a) means for providing a first D.C. potential;

(b) a first sine cosine potentiometer;

(c) means for applying the D.C. potential across the sine cosine potentiometer such that the amplitude of the D.C. potential represents the initial range of the simulated target and the shaft rotation angle of the potentiometer represents the initial bearing of the simulated target;

(d) means for providing a linearly varying D.C. potential;

(e) a second sine cosine potentiometer;

(f) means for applying the linearly varying D.C. potential across the second sine cosine potentiometer such that the amplitude of the linearly varying potential represents the change in range of the simulated target and the shaft rotation angle of the second potentiometer represents the change in bearing of the simulated target;

(g) means for summing the sine wave output signals of the first and second sine cosine potentiometers;

(h) a circuit for comparing the summed sine wave signals with the X sweep signal of the radar system and developing an output pulse when the amplitude of the X sweep potential exceeds the amplitude of the summed sine wave signal;

(i) means for summing the cosine wave output signal of the first and second sine cosine potentiometers;

(j) a circuit for comparing the summed cosine wave signals with the Y sweep signals of the radar system and developing an output pulse when the amplitude of the Y sweep potential exceeds the amplitude of the summed cosine wave signal;

(k) a coincidence circuit which is coupled to the comparison circuits and which provides an output pulse when the output pulses from the comparison circuits occur simultaneously;

(l) means for providing a second D.C. potential which represents the angle of elevation of the simulated target;

(m) means for providing a negative linearly varying D.C. potential which represents change in angle of elevation of the simulated target in one direction;

(n) means for providing a positive linearly varying D.C. potential which represents change in angle of elevation of the simulated target in the opposite direction;

(o) a manual switch;

(p) means for summing the second D.C. potential and the negatively varying D.C. potential when the switch is in one position;

(q) means for summing the second D.C. potential and the positively varying D.C. potential when the switch occupies its other position;

(r) a phantastron circuit;

(s) means for coupling the summed elevation potential to the plate of the phantastron circuit;

(t) means for triggering the phantastron circuit at the start of each elevation scan of the radar system and initiating its linear rundown voltage from the summed elevation potential;

(u) an "AND" circuit;

(v) and means for coupling the output circuit of the phantastron and the output of the coincidence circuit to the "AND" circuit; the output signal from the "AND" circuit being used to simulate the target return signal.

6. Apparatus for generating a simulated target return signal for application to the cathode ray indicator of a radar control system, said apparatus comprising:
  (a) means for providing a first D.C. potential;
  (b) a first sine cosine potentiometer;
  (c) means for applying the D.C. potential across the sine cosine potentiometer such that the amplitude of the D.C. potential represents the initial range of the simulated target and the shaft rotation angle of the potentiometer represents the initial bearing of the simulated target;
  (d) means for providing a linearly varying D.C. potential;
  (e) means for varying the amplitude of the linearly varying D.C. potential;
  (f) a second sine cosine potentiometer;
  (g) means for applying the linearly varying D.C. potential across the second sine cosine potentiometer such that the amplitude of the linearly varying potential represents the change in range of the simulated target and the shaft rotation angle of the second potentiometer represents the change in bearing of the simulated target;
  (h) means for summing the sine wave output signals of the first and second sine cosine potentiometers;
  (i) a circuit for comparing the summed sine wave signals with the X sweep signal of the radar system and developing an output pulse when the amplitude of the X sweep potential exceeds the amplitude of the summed sine wave signal;
  (j) means for summing the cosine wave output signal of the first and second sine cosine potentiometers;
  (k) a circuit for comparing the summed cosine wave signals with the Y sweep signals of the radar system and developing an output pulse when the amplitude of the Y sweep potential exceeds the amplitude of the summed cosine wave signal;
  (l) a coincidence circuit which is coupled to the comparison circuits and which provides an output pulse when the output pulses from the comparison circuits occur simultaneously;
  (m) means for providing a second D.C. potential which represents the angle of elevation of the simulated target;
  (n) means for providing a negative linearly varying D.C. potential which represents change in angle of elevation of the simulated target in one direction;
  (o) means for providing a positive linearly varying D.C. potential which represents change in angle of elevation of the simulated target in the opposite direction;
  (p) a manual switch;
  (q) means for summing the second D.C. potential and the negatively varying D.C. potential when the switch is in one position;
  (r) means for summing the second D.C. potential and the positively varying D.C. potential when the switch occupies its other position;
  (s) a phantastron circuit;
  (t) means for coupling the summed elevation potential to the plate of the phantastron circuit;
  (u) means for triggering the phantastron circuit at the start of each elevation scan of the radar system and initiating its linear rundown voltage from the summed elevation potential;
  (v) an "AND" circuit;
  (w) means for coupling the output circuit of the phantastron and the output of the coincidence circuit to the "AND" circuit;
  (x) and means for shaping the output signal of the "AND" circuit so that it resembles a video target return signal.

References Cited by the Examiner

UNITED STATES PATENTS

| | | | |
|---|---|---|---|
| 2,938,278 | 5/1960 | Brown | 343—17.7 X |
| 2,951,297 | 9/1960 | Colker | 35—10.4 |
| 3,115,535 | 12/1963 | Pastoriza et al. | 35—10.4 |
| 3,149,195 | 9/1964 | Cutler | 35—10.4 |

CHESTER L. JUSTUS, *Primary Examiner.*

M. R. WILBUR, T. H. TUBBESING,
*Assistant Examiners.*